(12) United States Patent
Timmons et al.

(10) Patent No.: US 10,583,539 B2
(45) Date of Patent: Mar. 10, 2020

(54) MAGNETIC DRILL PRESS

(71) Applicant: MILWAUKEE ELECTRIC TOOL CORPORATION, Brookfield, WI (US)

(72) Inventors: Terry L. Timmons, Milwaukee, WI (US); Andrew M. Plowman, Wauwatosa, WI (US); Gareth Mueckl, Milwaukee, WI (US); James Wekwert, Wauwatosa, WI (US)

(73) Assignee: MILWAUKEE ELECTRIC TOOL CORPORATION, Brookfield, WI (US)

( * ) Notice: Subject to any disclaimer, the term of this patent is extended or adjusted under 35 U.S.C. 154(b) by 0 days.

(21) Appl. No.: 16/279,147

(22) Filed: Feb. 19, 2019

(65) Prior Publication Data
US 2019/0176288 A1 Jun. 13, 2019

Related U.S. Application Data

(63) Continuation of application No. 13/837,429, filed on Mar. 15, 2013, now abandoned.
(Continued)

(51) Int. Cl.
*B23Q 5/32* (2006.01)
*B23Q 17/24* (2006.01)
(Continued)

(52) U.S. Cl.
CPC .......... *B23Q 17/2404* (2013.01); *B23B 47/26* (2013.01); *B25H 1/0071* (2013.01);
(Continued)

(58) Field of Classification Search
CPC ...... B23Q 5/32; B23Q 17/22; B23Q 17/2233; B23Q 17/2275; B23Q 17/2414;
(Continued)

(56) References Cited

U.S. PATENT DOCUMENTS

| 1,388,875 A | 8/1921 | Mirrielees |
| 2,110,958 A | 3/1938 | Lindner |

(Continued)

FOREIGN PATENT DOCUMENTS

| DE | 1791846 | 7/1959 |
| DE | 2362550 | 6/1975 |

(Continued)

OTHER PUBLICATIONS

Unitec Catalog, CS Unitec, Inc., 2010, 64 pages.
(Continued)

*Primary Examiner* — Alan Snyder
*Assistant Examiner* — Yasir A Diab
(74) *Attorney, Agent, or Firm* — Michael Best & Friedrich LLP

(57) ABSTRACT

A magnetic drill press includes a housing, a magnetic base coupled to the housing for engagement with a workpiece, and a motor carriage slidably coupled to the base housing. The magnetic drill press further includes an electric motor supported by the motor carriage and configured to rotate a bit about a bit axis, and a spindle assembly supported by the housing and coupled to the motor carriage for selectively positioning the motor carriage relative to the housing. The magnetic drill press further includes a handle hub coupled to the spindle assembly, and a ratchet assembly including a ratchet head coupled to the handle hub and a ratchet handle coupled to the ratchet head for actuating the spindle assembly by reciprocating motion of the ratchet handle.

19 Claims, 9 Drawing Sheets

Related U.S. Application Data

(60) Provisional application No. 61/638,158, filed on Apr. 25, 2012.

(51) Int. Cl.
  *B25H 1/00* (2006.01)
  *B23B 47/26* (2006.01)
  *B23Q 17/22* (2006.01)

(52) U.S. Cl.
  CPC .............. *B25H 1/0092* (2013.01); *B23Q 5/32* (2013.01); *B23Q 17/2233* (2013.01); *Y10T 408/21* (2015.01); *Y10T 408/554* (2015.01); *Y10T 408/6779* (2015.01)

(58) Field of Classification Search
  CPC  B23Q 17/2419; B25H 1/0071; B25H 1/0064; B25H 1/0057; B25H 1/0021; Y10T 408/6771; Y10T 408/6779; Y10T 408/6786; Y10T 408/554
  USPC ...................................................... 192/223.1
  See application file for complete search history.

(56) References Cited

U.S. PATENT DOCUMENTS

| | | | |
|---|---|---|---|
| 2,209,558 A | 7/1940 | Bing et al. |
| 2,280,437 A | 4/1942 | Levesque |
| 2,564,068 A | 8/1951 | Kearns |
| 2,622,457 A | 12/1952 | Buck |
| 2,639,412 A | 5/1953 | Kearns |
| 2,932,194 A | 10/1956 | Buck |
| 2,820,377 A | 1/1958 | Buck |
| 2,851,910 A | 9/1958 | Zwick et al. |
| 2,879,678 A | 3/1959 | Kaiser, Jr. |
| 2,887,910 A | 5/1959 | Williamson, Jr. |
| 3,011,113 A | 11/1961 | Jerue et al. |
| 3,049,030 A | 8/1962 | Meier |
| 3,130,633 A | 4/1964 | Rantsch |
| 3,321,688 A | 5/1967 | Von Delen |
| 3,342,089 A | 9/1967 | Palm |
| 3,435,714 A | 4/1969 | Bromberg et al. |
| 3,452,310 A | 6/1969 | Israelson |
| 3,566,239 A | 2/1971 | Taniguchi |
| 3,596,558 A | 8/1971 | Rydell |
| 3,623,823 A | 11/1971 | Val |
| 3,677,656 A | 7/1972 | Buck |
| 3,724,963 A | 4/1973 | Stadtmiller |
| 3,728,027 A | 4/1973 | Watanabe |
| 3,791,755 A | 2/1974 | Warren |
| 3,796,506 A | 3/1974 | Buck |
| 3,969,036 A | 7/1976 | Hougen |
| 4,012,162 A | 3/1977 | Warren |
| 4,055,824 A | 10/1977 | Baermann |
| RE30,519 E | 2/1981 | Hougen |
| 4,251,791 A | 2/1981 | Yanagisawa et al. |
| 4,261,673 A | 4/1981 | Hougen |
| 4,278,371 A | 7/1981 | Meyer |
| 4,317,176 A | 2/1982 | Saar et al. |
| 4,329,673 A | 5/1982 | Uchikune et al. |
| 4,390,309 A | 6/1983 | Fangmann |
| 4,393,363 A | 7/1983 | Iwasaki |
| 4,456,410 A | 6/1984 | Mikiya et al. |
| 4,541,759 A | 9/1985 | Miyoshi |
| 4,559,577 A | 12/1985 | Shoji et al. |
| 4,582,105 A | 4/1986 | Wolff |
| 4,591,301 A | 5/1986 | Pelfrey |
| 4,604,006 A | 8/1986 | Shoji et al. |
| 4,639,170 A | 1/1987 | Palm |
| 4,655,649 A | 4/1987 | Itzov et al. |
| 4,687,385 A | 8/1987 | Palm |
| 4,780,654 A | 10/1988 | Shoji et al. |
| 4,820,088 A | 4/1989 | Ooki et al. |
| 4,831,364 A | 5/1989 | Shinohara et al. |
| 4,887,193 A | 12/1989 | Dieckmann |
| RE33,145 E | 1/1990 | Palm |
| 5,007,776 A | 4/1991 | Shoji |
| 5,035,547 A | 7/1991 | Shoji |
| 5,035,549 A | 7/1991 | Asano et al. |
| 5,087,157 A | 2/1992 | Shoji et al. |
| 5,096,339 A | 3/1992 | Shoji |
| 5,096,340 A | 3/1992 | Forsgren |
| 5,106,242 A | 4/1992 | Obrecht et al. |
| 5,165,827 A | 11/1992 | Miller |
| 5,174,690 A | 12/1992 | Targett et al. |
| 5,207,539 A | 5/1993 | Mueller |
| 5,266,914 A | 11/1993 | Dickson et al. |
| 5,275,514 A | 1/1994 | Johnson |
| 5,284,325 A | 2/1994 | Sasaki et al. |
| 5,300,883 A | 4/1994 | Richeson |
| 5,328,303 A | 7/1994 | Jang |
| 5,342,153 A | 8/1994 | Dobkins |
| 5,361,615 A | 11/1994 | Kirii et al. |
| 5,415,503 A | 5/1995 | Strange et al. |
| 5,525,950 A | 6/1996 | Wang |
| 5,816,898 A | 10/1998 | Wirth, Jr. et al. |
| 5,899,644 A | 5/1999 | Buck et al. |
| 5,902,076 A | 5/1999 | Miller et al. |
| 6,071,050 A | 6/2000 | Patrick et al. |
| 6,102,633 A | 8/2000 | Uehlein-Proctor |
| 6,223,794 B1 | 5/2001 | Jones |
| 6,280,123 B1 | 8/2001 | Gill |
| 6,331,810 B1 | 12/2001 | Jung |
| 6,375,395 B1 | 4/2002 | Heintzeman |
| D459,372 S | 6/2002 | Asano |
| 6,443,675 B1 | 9/2002 | Kopras et al. |
| 6,489,871 B1 | 12/2002 | Barton |
| 6,502,949 B1 | 1/2003 | Horiyama et al. |
| 6,636,153 B1 | 10/2003 | Barton et al. |
| 6,692,201 B2 | 2/2004 | Soderman |
| 6,754,935 B2 | 6/2004 | Pozgay et al. |
| 6,853,187 B2 | 2/2005 | Fainchtein |
| 6,890,135 B2 | 5/2005 | Kopras et al. |
| 6,921,235 B2 | 7/2005 | Chen |
| 7,009,480 B2 | 3/2006 | Tsui et al. |
| 7,012,495 B2 | 3/2006 | Underwood et al. |
| 7,058,291 B2 | 6/2006 | Weaver et al. |
| 7,121,773 B2 | 10/2006 | Mikiya et al. |
| 7,121,776 B2 | 10/2006 | Story, Jr. |
| 7,161,451 B2 | 1/2007 | Shen |
| 7,224,251 B2 | 5/2007 | Wang |
| 7,267,512 B1 | 9/2007 | Mueller |
| 7,377,202 B1 | 5/2008 | Shibata |
| 7,520,702 B2 | 4/2009 | Wiehler et al. |
| 7,570,047 B2 | 8/2009 | Stuve et al. |
| 7,784,405 B2 | 8/2010 | Rose et al. |
| 7,850,325 B2 | 12/2010 | Wall et al. |
| 7,862,267 B2 | 1/2011 | Shimada |
| 7,930,960 B2 | 4/2011 | Duginske |
| 7,936,142 B2 | 5/2011 | Otsuka et al. |
| 8,011,283 B2 | 9/2011 | Takase |
| 8,164,333 B2 | 4/2012 | Rugar et al. |
| 8,166,818 B2 | 5/2012 | Dwyer et al. |
| 8,183,965 B2 | 5/2012 | Michael |
| 8,350,663 B1 | 1/2013 | Michael |
| 8,368,494 B2 | 2/2013 | Fiedler |
| 8,375,541 B1 | 2/2013 | Beachy et al. |
| 8,376,667 B2 | 2/2013 | Wilbert et al. |
| 8,378,836 B2 | 2/2013 | Kopp et al. |
| 2003/0184995 A1 | 10/2003 | Seibert et al. |
| 2003/0222649 A1 | 12/2003 | Fainchtein |
| 2004/0174699 A1 | 9/2004 | Minalga |
| 2005/0157489 A1 | 7/2005 | Oomori et al. |
| 2006/0072306 A1 | 4/2006 | Woodyard |
| 2006/0104731 A1 | 5/2006 | Etter et al. |
| 2006/0250714 A1 | 11/2006 | Von Limburg |
| 2007/0059186 A1 | 3/2007 | Weaver et al. |
| 2007/0103119 A1 | 5/2007 | Young |
| 2007/0132428 A1 | 6/2007 | Wise |
| 2008/0053188 A1 | 3/2008 | Itoh |
| 2009/0013794 A1 | 1/2009 | Garshelis et al. |
| 2009/0027149 A1 | 1/2009 | Kocijan |
| 2009/0028653 A1 | 1/2009 | Wilbert et al. |
| 2009/0196696 A1 | 8/2009 | Otsuka et al. |

(56) References Cited

U.S. PATENT DOCUMENTS

| | | |
|---|---|---|
| 2010/0021249 A1 | 1/2010 | Beichter |
| 2010/0028093 A1 | 2/2010 | Otsuka |
| 2010/0242601 A1 | 9/2010 | Dwyer et al. |
| 2010/0290847 A1 | 11/2010 | Beichter et al. |
| 2010/0290848 A1 | 11/2010 | Baratta |
| 2010/0295546 A1 | 11/2010 | Walther et al. |
| 2011/0027026 A1 | 2/2011 | Omi et al. |
| 2011/0304325 A1 | 12/2011 | Walther et al. |
| 2011/0308330 A1 | 12/2011 | May |
| 2012/0170246 A1 | 7/2012 | Huang |
| 2013/0002382 A1 | 1/2013 | Zhang et al. |
| 2013/0004255 A1 | 1/2013 | Fischinger et al. |
| 2013/0141090 A1 | 6/2013 | Sidman |

FOREIGN PATENT DOCUMENTS

| | | |
|---|---|---|
| DE | 2915554 | 10/1980 |
| DE | 3017549 | 10/1981 |
| DE | 3205202 | 8/1983 |
| DE | 202006010017 | 10/2006 |
| DE | 102006029611 | 12/2007 |
| DE | 102007042758 | 3/2009 |
| EP | 0157790 | 10/1985 |
| EP | 0511486 | 7/1996 |
| EP | 0565347 | 12/1996 |
| EP | 0578299 | 5/1997 |
| EP | 0699899 | 10/2001 |
| EP | 1642686 | 4/2006 |
| EP | 1419034 | 7/2006 |
| EP | 2020394 | 2/2009 |
| EP | 2072443 | 6/2009 |
| EP | 2147755 | 1/2010 |
| EP | 2259077 | 7/2010 |
| EP | 2226643 | 9/2010 |
| EP | 2251154 | 11/2010 |
| EP | 2397829 | 12/2011 |
| EP | 2502800 | 5/2013 |
| FR | 2359687 | 2/1978 |
| GB | 490749 | 8/1939 |
| GB | 695261 | 8/1953 |
| GB | 702366 | 1/1954 |
| GB | 706838 | 4/1954 |
| GB | 1159955 | 7/1969 |
| JP | 2002254227 | 9/2002 |
| JP | 2004009149 | 1/2004 |
| WO | WO0167122 | 9/2001 |
| WO | WO03009972 | 2/2003 |
| WO | WO2006137386 | 12/2006 |
| WO | WO2007053519 | 5/2007 |
| WO | WO2010020006 | 2/2010 |
| WO | WO2010040997 | 4/2010 |
| WO | WO2010084165 | 7/2010 |
| WO | WO2010135788 | 12/2010 |
| WO | WO2012144769 | 10/2012 |

OTHER PUBLICATIONS

PCT/US2013/038194 International Search Report and Written Opinion dated Aug. 19, 2013, 15 pages.

International Search Report and Written Opinion for Application No. PCT/US2014/034674 dated Aug. 29, 2014, 11 pages.

MAGNETIC DRILL PRESS

CROSS-REFERENCE TO RELATED APPLICATIONS

This application is a continuation of co-pending U.S. patent application Ser. No. 13/837,429 filed on Mar. 15, 2013, which claims priority to U.S. Provisional Patent Application No. 61/638,158 filed on Apr. 25, 2012, the entire contents of both of which are incorporated herein by reference.

BACKGROUND

The present invention generally relates to power tools and, more specifically, to magnetic-base drill presses.

Magnetic-base drill presses perform drilling operations by attaching a base portion of the drill press magnetically to a ferromagnetic workpiece. The magnetic base of a magnetic drill press is switchably operable between magnetized and demagnetized positions using electromagnets or permanent magnets.

SUMMARY

In one embodiment, the invention provides a magnetic drill press. The magnetic drill press includes a housing, a magnetic base coupled to the housing for engagement with a workpiece, and a motor carriage slidably coupled to the base housing. The magnetic drill press further includes an electric motor supported by the motor carriage and configured to rotate a bit about a bit axis, and a spindle assembly supported by the housing and coupled to the motor carriage for selectively positioning the motor carriage relative to the housing. The magnetic drill press further includes a handle hub coupled to the spindle assembly, and a ratchet assembly including a ratchet head coupled to the handle hub and a ratchet handle coupled to the ratchet head for actuating the spindle assembly by reciprocating motion of the ratchet handle.

In another embodiment the invention provides a magnetic drill press. The magnetic drill press includes a housing, a magnetic base coupled to the housing for engagement with a workpiece, a motor carriage slidably coupled to the housing, and an electric motor supported by the motor carriage and configured to rotate a bit about a bit axis. The magnetic drill press further includes a spindle assembly supported by the housing and coupled to the motor carriage for selectively positioning the motor carriage relative to the housing, the spindle assembly includes a collar fixed to the housing and having an inside surface, a first spindle that receives a torque input from a user of the drill press in a first rotational direction, causing the first spindle to rotate, a second spindle drivingly coupled to the motor carriage, a spindle hub body acting as an interface between the first spindle and the second spindle, and a dog member positioned between the inside surface of the collar and the spindle hub body. The dog member is disengaged from the inside surface of the collar in response to torque input on the first spindle in the first rotational direction to permit movement of the motor carriage relative to the base housing, and the dog member is engaged with the inside surface of the collar in response to a torque input on the second spindle in an opposite, second rotational direction to inhibit movement of the motor carriage relative to the housing.

Other aspects of the invention will become apparent by consideration of the detailed description and accompanying drawings.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

DETAILED DESCRIPTION

Figure 1:
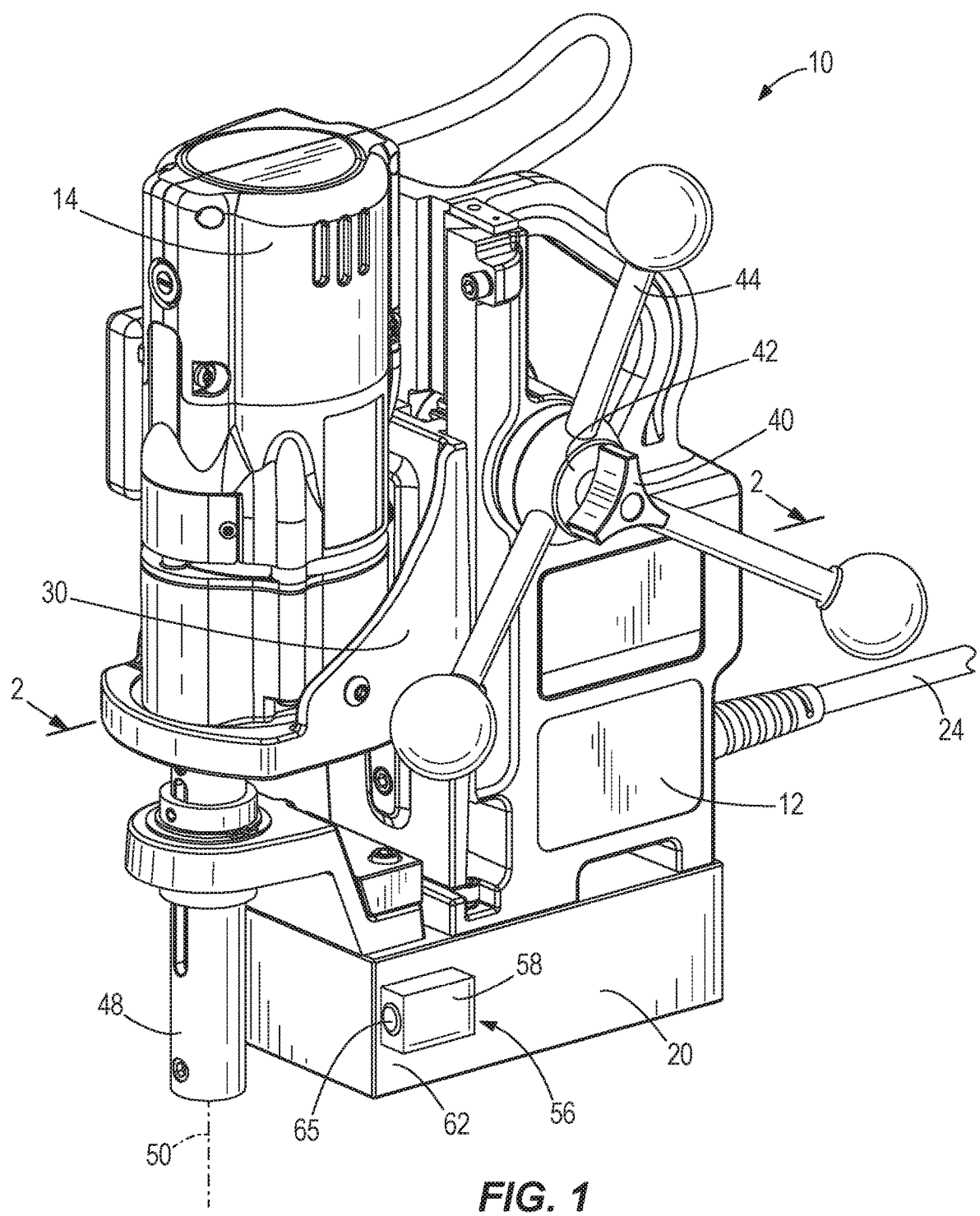
FIG. 1 is a perspective view of a magnetic drill press according to one embodiment of the invention.
Figure 2:
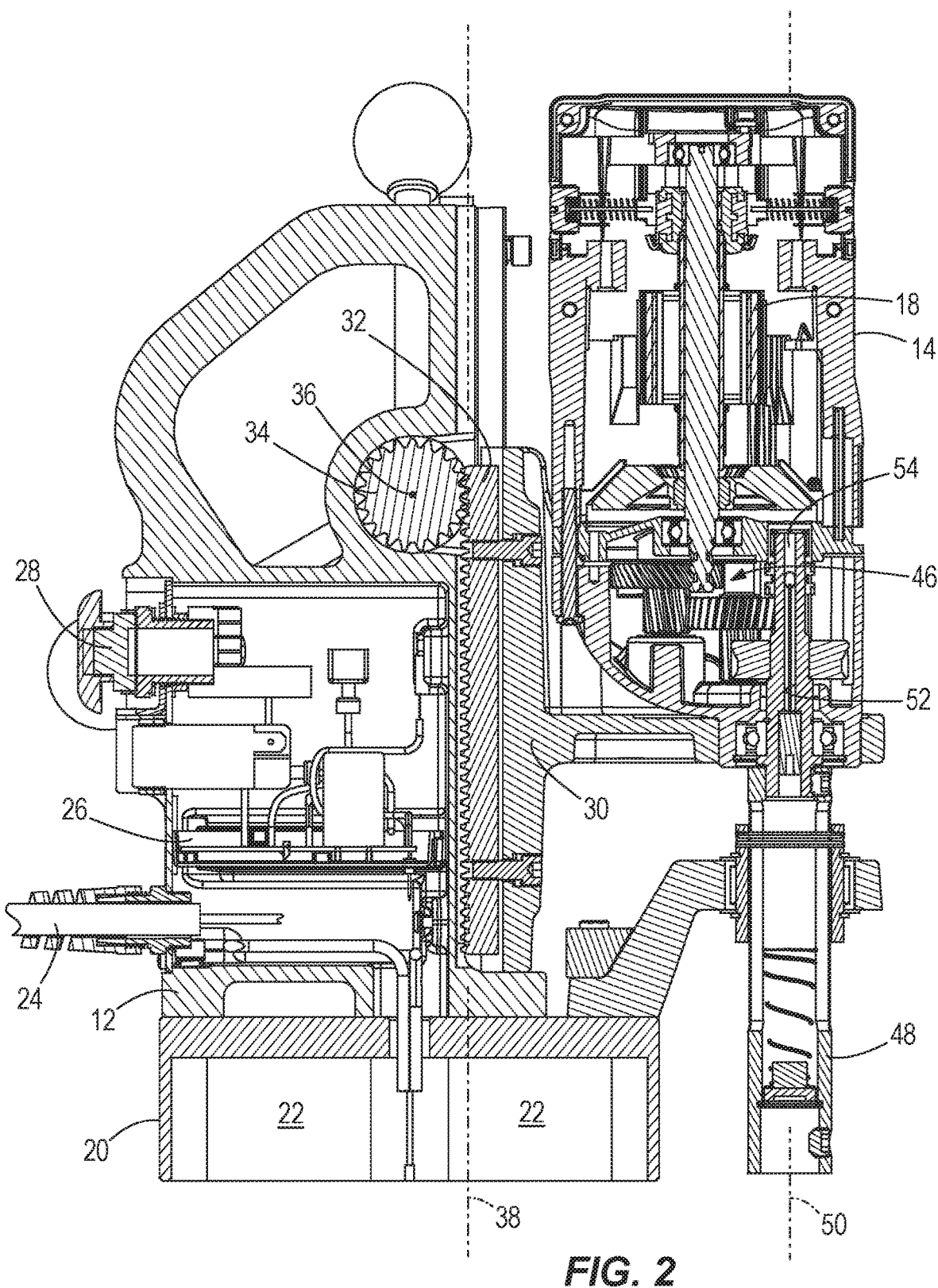
FIG. 2 is a sectional view of the magnetic drill press of FIG. 1, along section line 2-2.

FIG. 1 illustrates a drill press 10 according to one embodiment of the invention. The drill press 10 includes a base housing 12 and a motor housing 14. An electric motor 18 is housed within the motor housing 14 (FIG. 2). The drill press 10 further includes a magnetic base 20 for magnetically detachably coupling the drill press 10 and a ferromagnetic workpiece. Once magnetized, the magnetic base 20 secures the drill press 10 to the workpiece via a magnetic field generated by magnets 22 (FIG. 2).

Referring to FIG. 1, the drill press 10 includes an electrical cord 24 to connect to an AC power source, such as a wall outlet or a generator. The AC power source may be a conventional 120V or 240V power source. Referring to FIG. 2, the electric cord 24 is received in the base housing 12 and electrically coupled to a power module 26. A motor control switch 28 is coupled to base housing 12. The motor control switch 28 controls the supply of power to the electric motor 18 from the power module 26.

The motor housing 14 and the motor 18 are coupled to a motor carriage 30. A rack 32 is coupled to the motor carriage 30. A pinion 34 is rotatably coupled to the base housing 12 about a pinion axis 36. The pinion 34 engages the rack 32 for vertical actuation of the motor carriage 30 along a carriage axis 38. The pinion 34 is actuated by a user via a handle assembly 40 (FIG. 1). The handle assembly includes a handle hub 42. Three handle members 44 are coupled to the handle hub 42 in a radial arrangement.

Referring to FIG. 2, the motor 18 is coupled to a bit drive assembly 46. A bit 48 is selectively engageable with the bit drive assembly 46 for rotation about a bit axis 50. The bit axis 50 is substantially parallel to the carriage axis 38. Referring to FIG. 2, the bit drive assembly 46 defines a hollow passage 52 along the bit axis 50.

A laser 54 is disposed within the motor housing 14 for illumination along the bit axis 50. When used in combination with a hollow-centered bit, such as a hole saw, the laser 54 illuminates a workpiece along the bit axis 50. Thus, the laser 54 facilitates alignment of the bit axis 50 with a desired drilling axis. In some embodiments, the laser 54 may be electrically coupled to the power module 26, and selectively controlled by the motor control switch 28 or a separate switch. In other embodiments, the laser 54 may be powered by a separate power supply, such as a battery.

Figure 3:
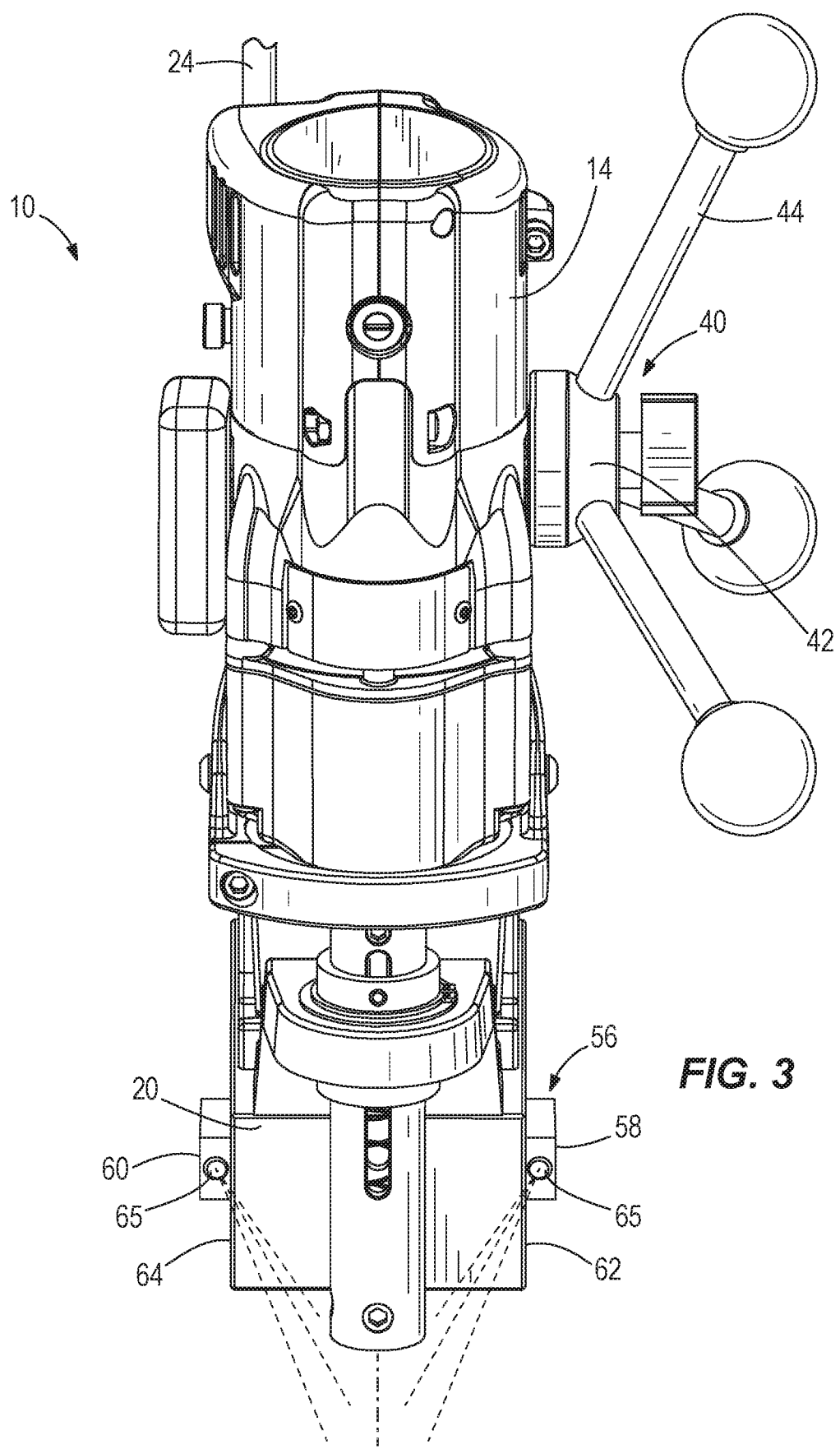
FIG. 3 is a front view of the drill press of FIG. 1.

Referring to FIGS. 1 and 3, the drill press 10 includes a workpiece illumination system 56. The workpiece illumination system 56 includes a first illuminator module 58 and, referring to FIG. 3, a second illuminator module 60. The first illuminator module 58 is coupled to a first side portion 62 of the magnetic base 20. The second illuminator module 60 is coupled to a second side portion 64 of the magnetic base 20. Each of the first illuminator module 58 and the second illuminator module 60 includes a light assembly 65, such as an incandescent bulb, or light emitting diode (LED). Each of the first illuminator module 58 and the second illuminator module 62 is aligned to illuminate a work area of the work piece. In some embodiments, the workpiece illumination system 56 may be electrically coupled to the power module 26, and selectively controlled by the motor control switch 28, or a separate switch. In other embodiments, the workpiece illumination system 56 may be powered by a separate power supply, such as a battery.

Figure 4:
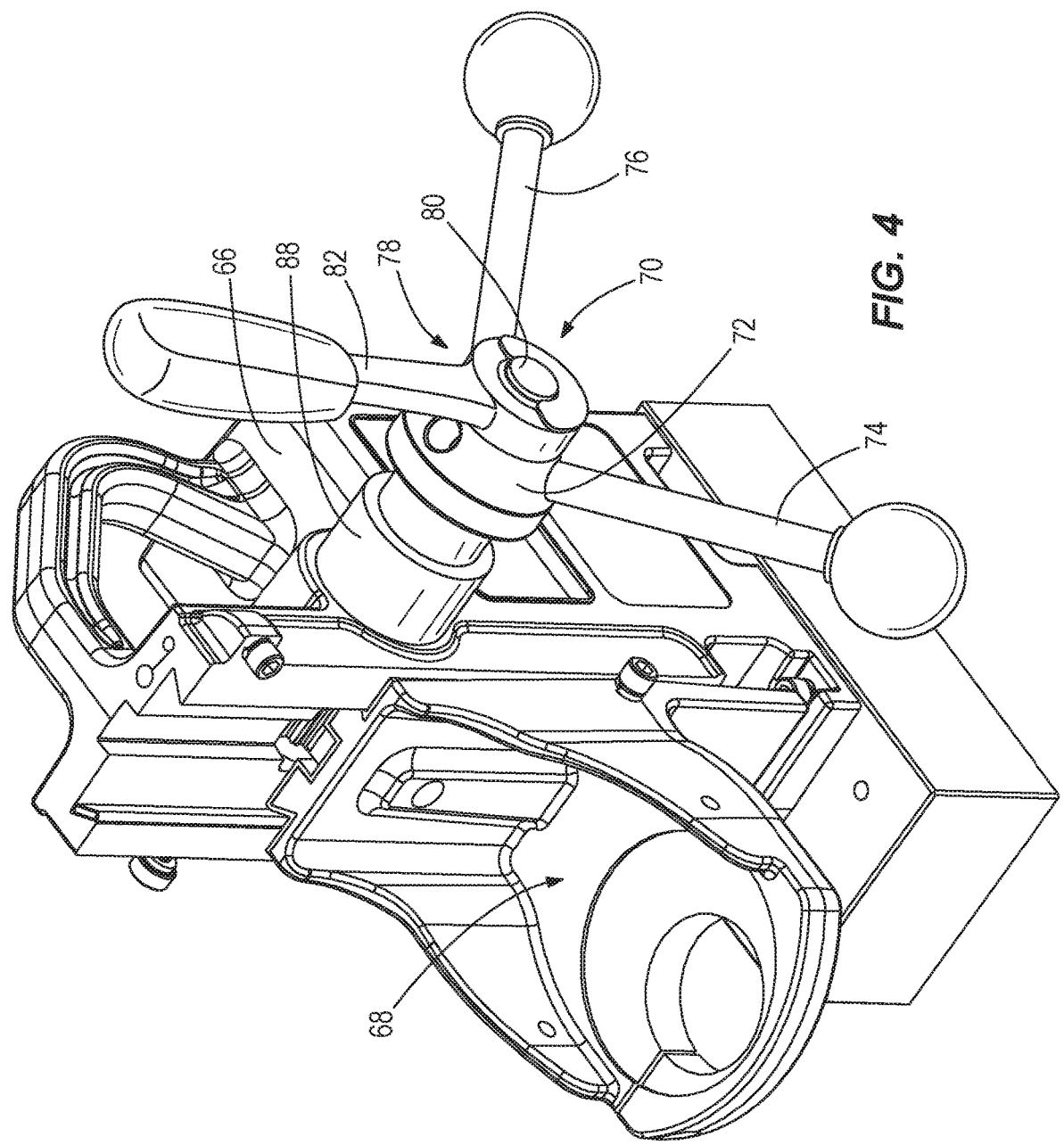
FIG. 4 is a perspective view of a housing and motor carriage assembly of a drill press according to another embodiment of the invention.

FIG. 4 illustrates a base housing 66 and motor carriage 68 according to another embodiment of the invention. In the embodiment of FIG. 4, a handle assembly 70 includes a handle hub 72. A first handle member 74 and a second handle member 76 are coupled to the handle hub 72. A ratchet assembly 78 is additionally coupled to the handle hub 72. The ratchet assembly 78 includes a ratchet head portion 80 and a ratchet handle portion 82 coupled to the ratchet head portion 80. The ratchet assembly 78 allows a user to actuate the handle hub 72 with reciprocating motion of the ratchet handle portion 82.

Figure 5:
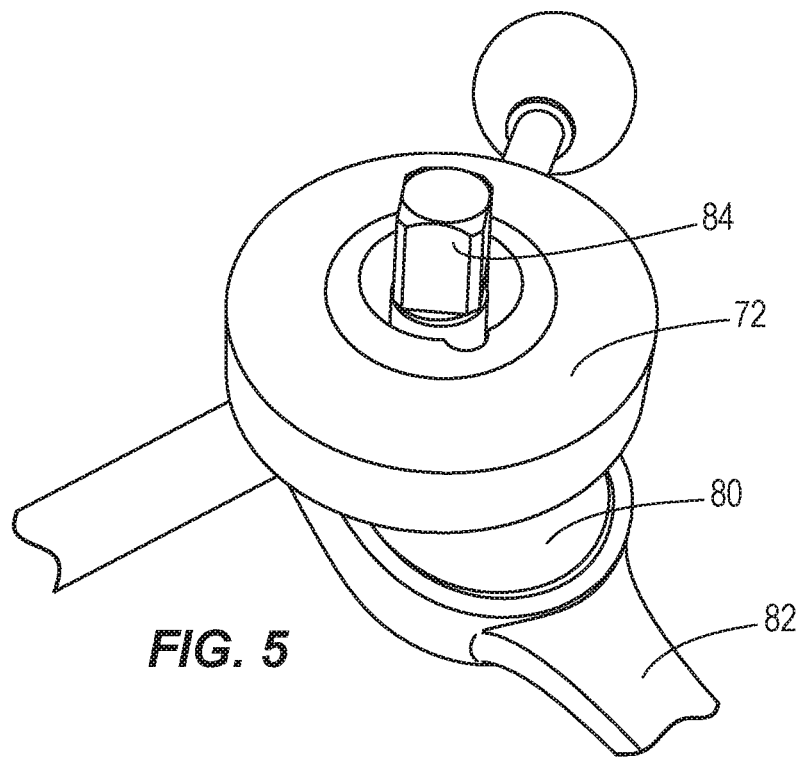
FIG. 5 is a perspective view of a handle ratchet assembly of the housing and motor carriage assembly of FIG. 4.
Figure 6:
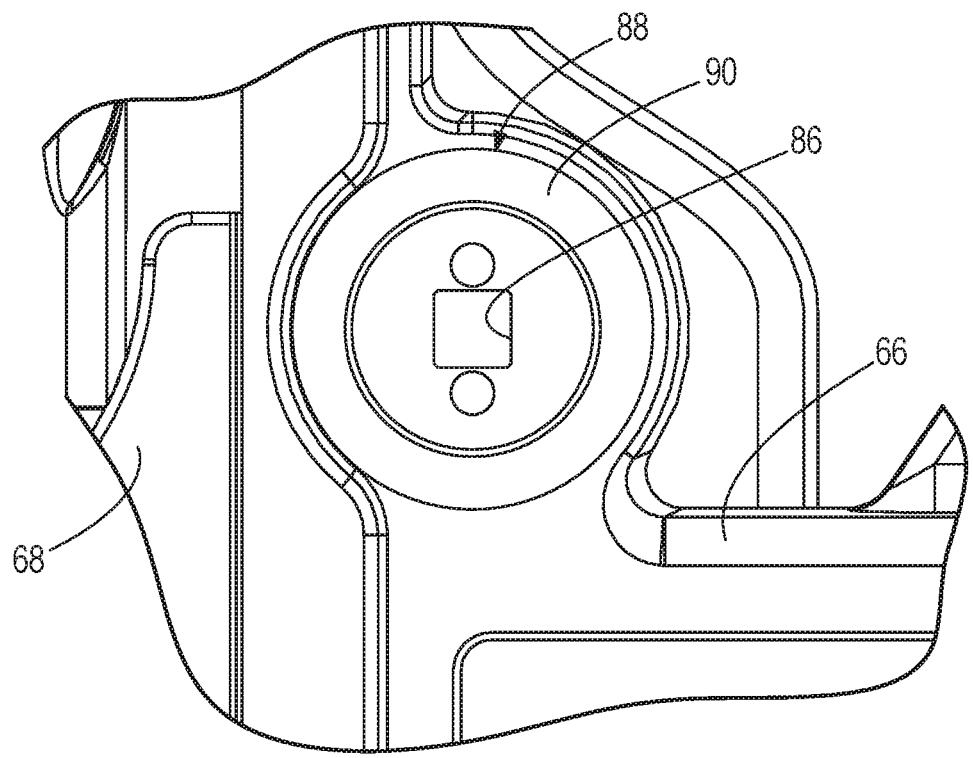
FIG. 6 is a side view of a spindle assembly installed in the housing and motor carriage assembly of FIG. 4.

Referring to FIG. 5, the handle hub 72 includes a drive member 84. The drive member 84 is configured to be received by a square drive socket 86 of a spindle assembly 88 (FIG. 6). The spindle assembly 88 acts as an interface between the handle assembly 70 and the base housing pinion, such as the pinion 34 of FIG. 2.

Figure 7:
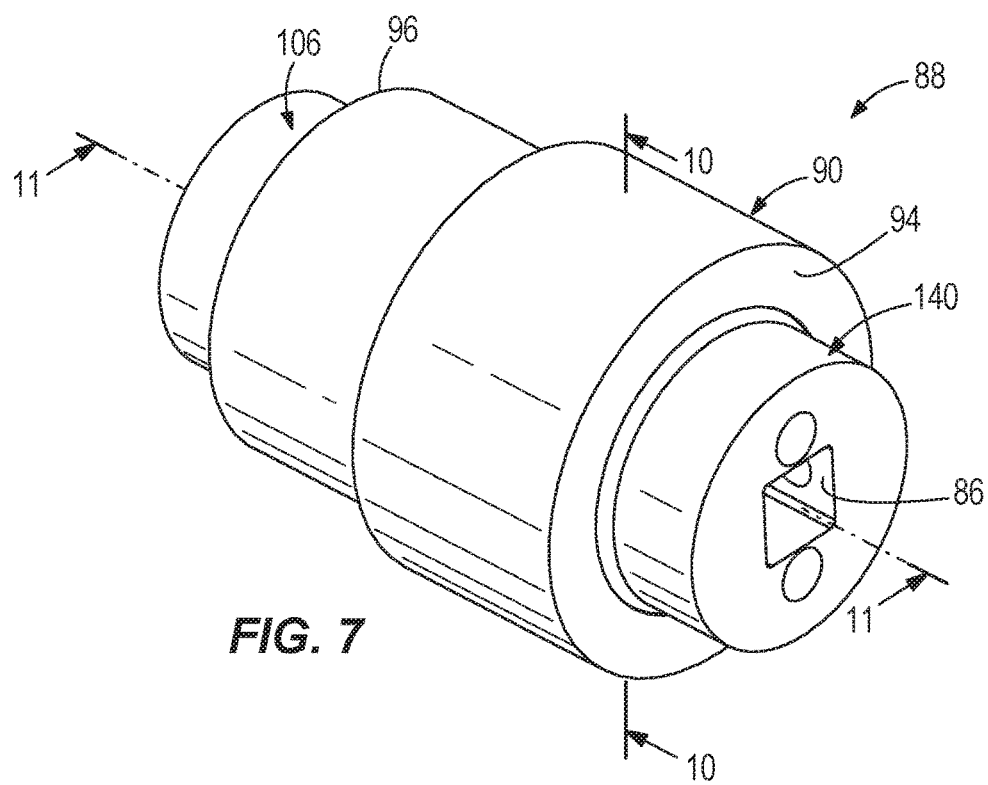
FIG. 7 is a perspective view of the spindle assembly of FIG. 6.
Figure 9:
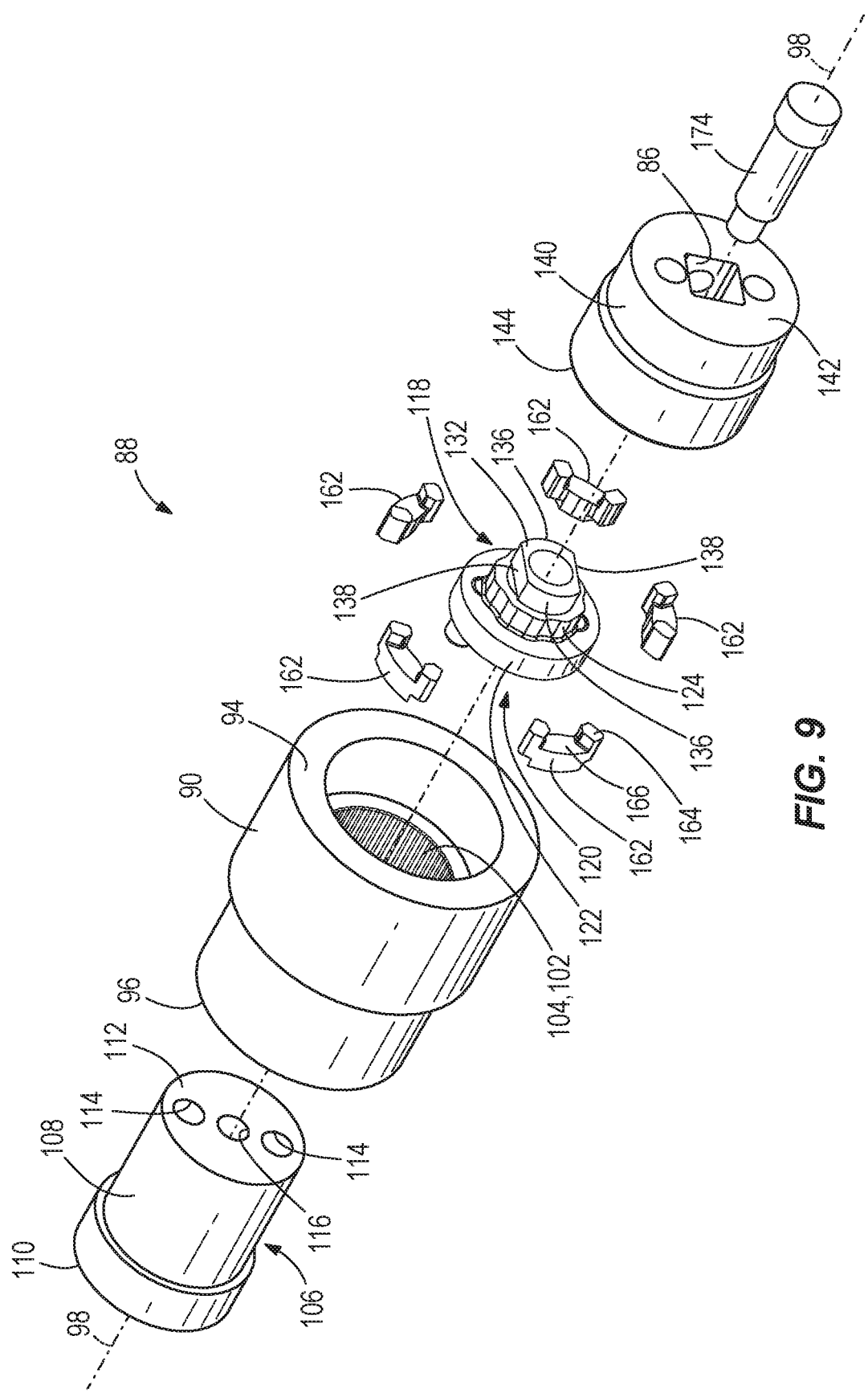
FIG. 9 is an exploded view of the spindle assembly of FIG. 7.
Figure 11:
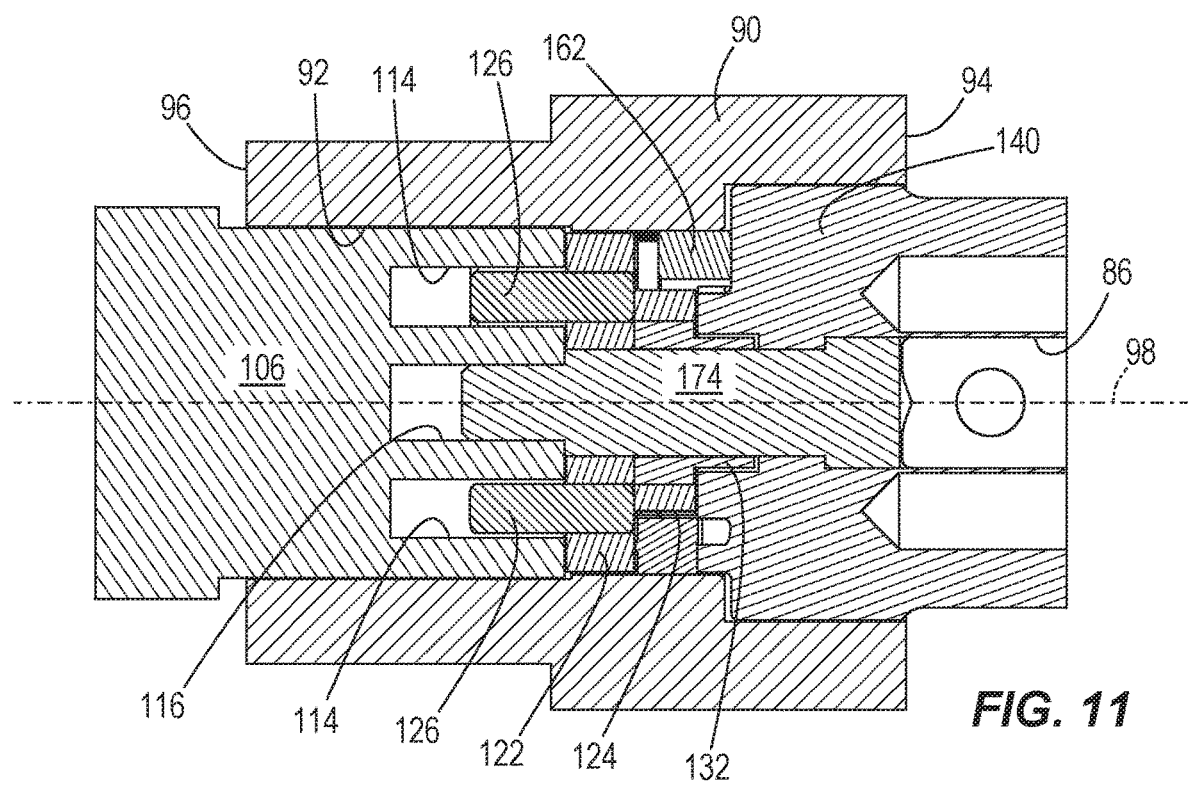
FIG. 11 is a section view of the spindle assembly taken along section line 11-11 of FIG. 7.

Referring to FIG. 7, the spindle assembly 88 includes a collar 90. The collar 90 is fixedly coupled to the base housing 66, as illustrated in FIG. 6. Referring to FIG. 11, the collar 90 has a hollow center 92 extending between a handle end 94 and a pinion end 96 along a spindle axis 98. Referring to FIG. 9, the collar 90 defines a toothed portion 102 between the handle end 94 and the pinion end 96. The toothed portion 102 includes axially-extending, radially projecting, tooth members 104.

An inner spindle 106 is rotatably coupled to the collar 90. The inner spindle 106 includes a substantially cylindrical body 108, extending from a pinion end 110 to a hub end 112 along the pinion axis 98. The pinion end 110 is coupled to the pinion 34 (FIG. 2) for rotation of the pinion 34 about the pinion axis 36 and, thereby, to actuate the rack 32 of the motor carriage 30. Referring to FIG. 9, the hub end 112 of the inner spindle 106 defines two engagement recesses 114 and a threaded aperture 116.

Figure 10:
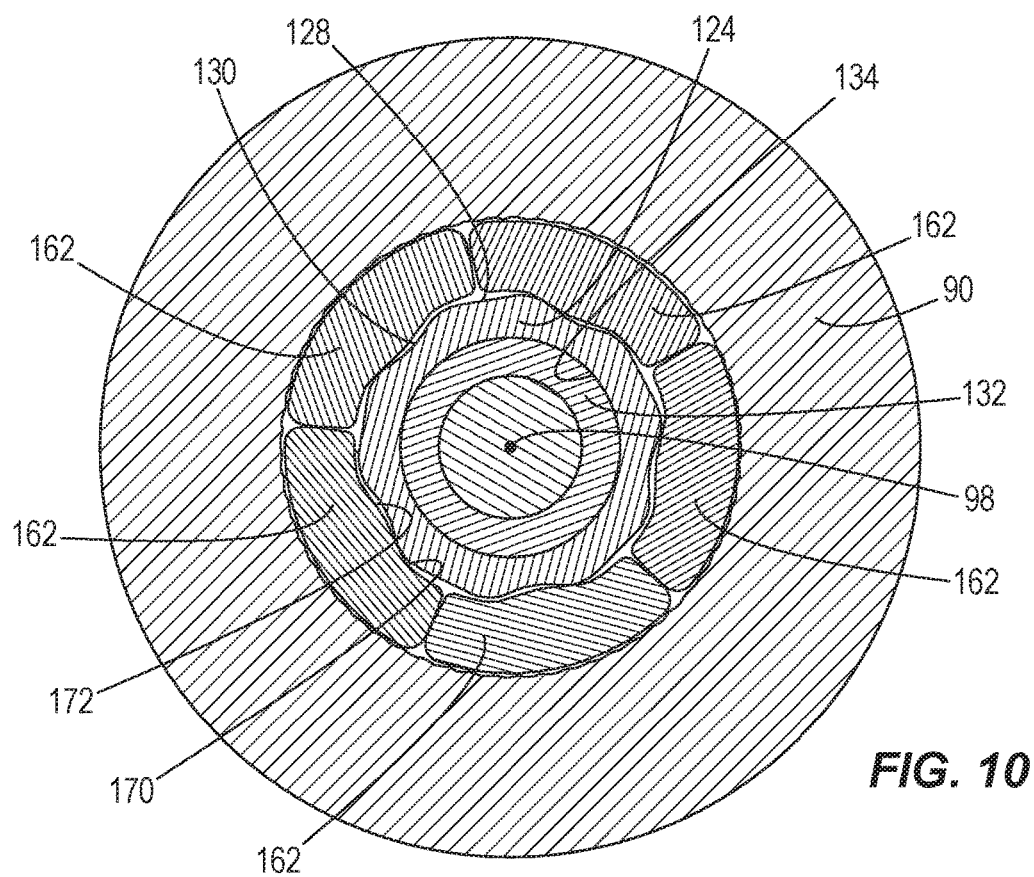
FIG. 10 is a section view of the spindle assembly taken along section line 10-10 of FIG. 7.

A spindle hub assembly 118 includes a hub body 120. The hub body 120 includes a cylindrical portion 122 and a dog actuator portion 124. Referring to FIG. 11, the cylindrical portion 122 receives two drive pins 126 for driving engagement with the engagement recesses 114 of the inner spindle 106. Referring to FIG. 10, the dog actuator portion 124 defines five radial lobes 128 and five radial recesses 130, with the radial lobes 128 and radial recesses 130 alternating circumferentially about the spindle axis 98. Referring to FIG. 9, the dog actuator portion 124 also receives a torque transfer link 132. More specifically, the torque transfer link 132 is fixedly received in a circular recess 134 defined in the dog actuator portion 124. The torque transfer link 132 defines a pair of opposing convex surfaces 136, separated by a pair of flat, mutually parallel surfaces 138.

Figure 8:
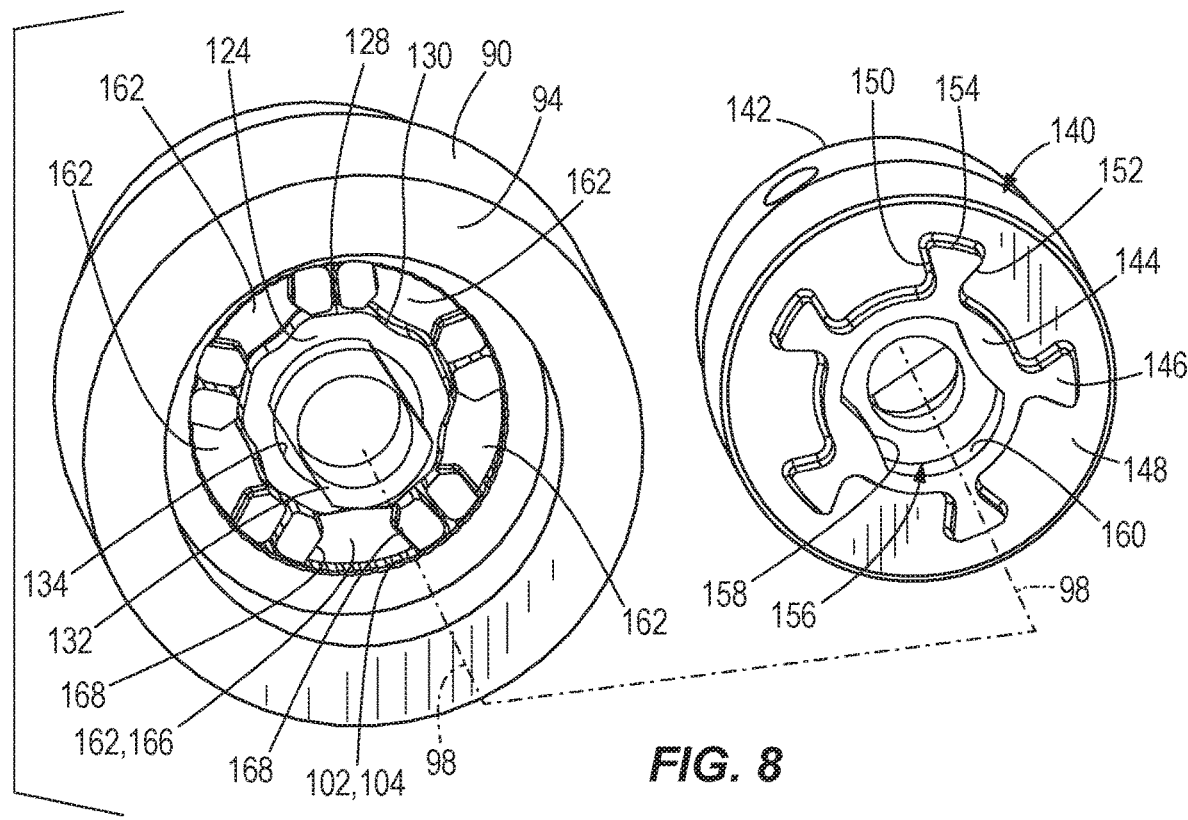
FIG. 8 is a partially exploded view of the spindle assembly of FIG. 7.

Referring to FIGS. 7 and 10, an outer spindle 140 is rotatably coupled to the collar 90 at the handle end 94. The outer spindle 140 defines, on a first end 142, the square drive socket 86 to which the handle assembly 70 is selectively coupled. Referring to FIG. 8, a dog carrier hub 144 and five dog lugs 146 extend axially from the second end 148 of the outer spindle 140. Each of the dog carrier lugs 146 extends radially from a substantially circular dog hub 148. In the illustrated embodiment, five dog carrier lugs 146 are circumferentially evenly arranged about the spindle axis 98. Each dog carrier lug 146 defines a first alignment surface 150, a second alignment surface 152, and a circumferential surface 154.

The dog hub 148 defines a torque transfer recess 156. The torque transfer recess 156 includes a pair of opposing convex walls 158, separated by a pair of opposing concave wall 160. The torque transfer recess 156 is configured to rotatably receive the torque transfer link 132. More specifically, the convex surfaces 160 of the torque transfer recess 156 allow for a small degree of relative rotation (e.g., less than ten degrees) between the outer spindle 140 and the torque transfer link 132.

Referring to FIG. 9, five dog members 162 are arranged circumferentially about the pinion axis 98, between the outer spindle 140 and the hub body 120. An outer end 164 of each dog member 162 defines a groove 166 configured to receive the dog carrier lugs 146. Referring to FIG. 8, non-radial side walls 168 of the grooves 166 are configured to be engaged by the first alignment surface 150 or second alignment surface 152 of the dog carrier lugs 146. Referring to FIG. 10, an inner radial surface 170 of each dog member 162 defines a dog cam lobe 172.

Referring to FIGS. 9 and 11, the spindle assembly 88 is assembled with a shoulder bolt 174. More specifically, the shoulder bolt 174 extends through the outer spindle 140 and the hub assembly 118 to threadedly engage the threaded recess 116 of the inner spindle 106. The dog members 162 float between the outer spindle 140, the hub assembly 118, and the hollow center 92 of the collar 90.

When the handle assembly 70 (FIG. 4) is actuated by a user to, for example, drive a bit into a work piece, the drive member 84 (FIG. 5) transmits torque to the outer spindle 140 at the square drive socket 86 (FIG. 7). After a small degree of rotation (e.g., less than 10 degrees), torque applied to the outer spindle is transmitted to torque transfer link 132 via the torque transfer recess 156 of the outer spindle (FIG. 8). Referring to FIG. 11, from the torque transfer link 132, torque is transmitted through the cylindrical portion 122. From the cylindrical portion 122, the torque is transferred to the inner spindle 106 via the drive pins 126. Simultaneously, and with reference to FIG. 8, the first alignment surfaces 150 or second alignment surfaces 152 (depending upon a direction of rotation about the spindle axis 98) of the dog carrier lugs 146 engage the non-radial side walls 168 of the dog members 162 and biases the dog members 162 radially inward, thereby substantially preventing the dog members 162 from binding engagement with the teeth 104 (FIG. 9) of the collar 90.

When a user releases the handle assembly 70 (FIG. 4), the dog carrier lugs 146 no longer force the dog members 162 in an inwardly radial direction. Furthermore, any torque applied to the inner spindle 106 (e.g., from the weight of the motor carriage 68) causes the hub assembly 118 to rotate relative to the outer spindle 140, until the torque transfer link 132 reengages the torque transfer recess 156 (e.g., less than ten degrees of rotation). Referring to FIG. 10, the rotation of the hub assembly 118 causes the radial lobes 128 of the dog actuator portion 124 to engage the dog cam lobes 172, thereby forcing the dog members 162 radially outward, and into engagement with the teeth 104 of the collar 90. Engagement of the dogs 162 with the collar 90 substantially inhibits further rotation of the inner spindle 106, effectively causing "spindle lock." In order to disengage the spindle lock condition, a user merely applies torque through the outer spindle 140 (via the handle assembly 70), thereby disengaging the dog members 162 from the teeth 104 of the collar 90 by applying an inward radial force from the dog carrier lugs 146. This substantially automatic spindle lock operation is especially advantageous when using the ratchet assembly 78, as the spindle assembly 88 maintains its position while cycling the ratchet assembly 78.

Figure 12:
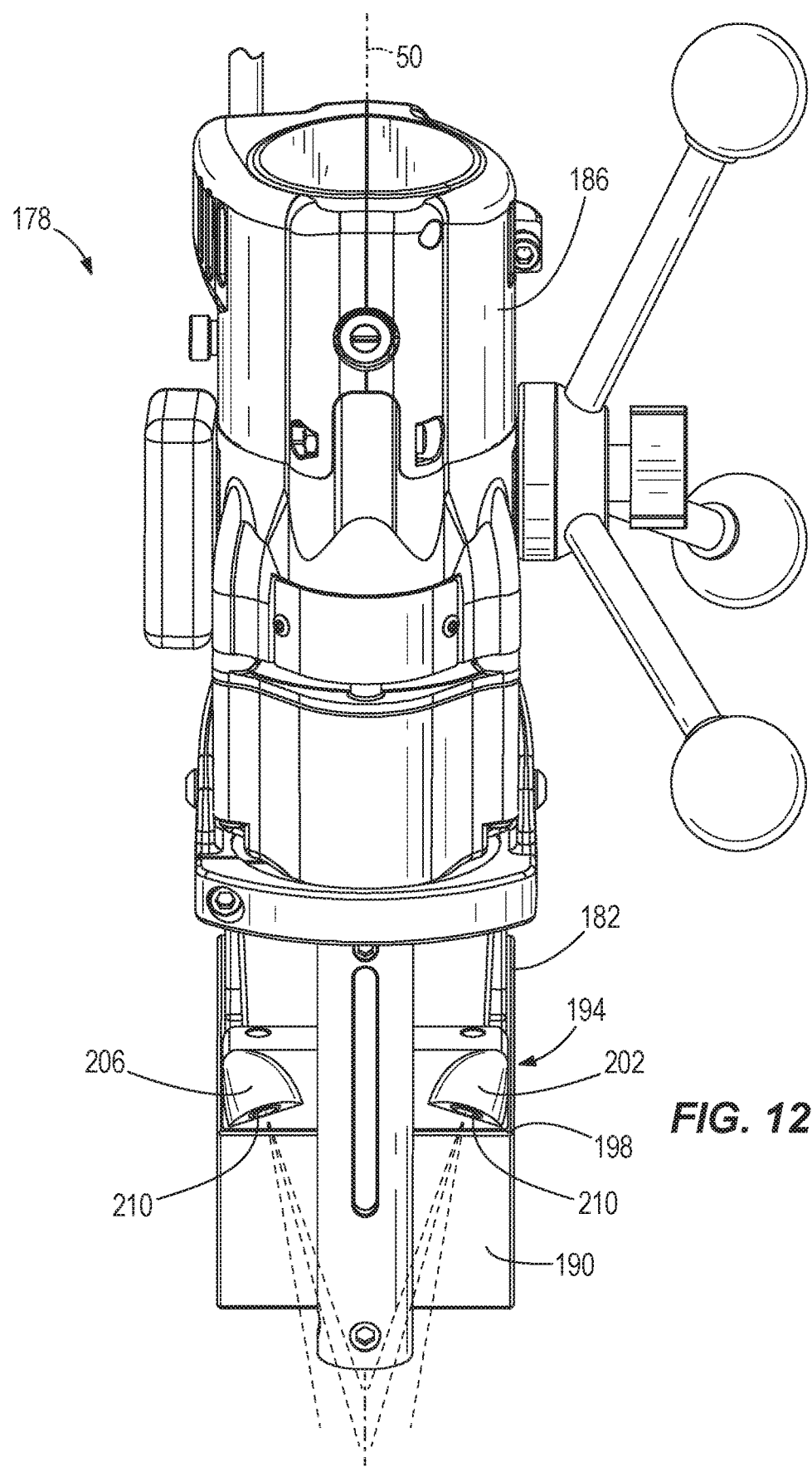
FIG. 12 is a front view of a magnetic drill press according to another embodiment of the invention.

FIG. 12 illustrates another embodiment of a drill press 178. The drill press has substantial similarities to the drill press 10 described with respect to FIGS. 1-11, and only those aspects that differ from the embodiments of FIGS. 1-11 will be described herein.

The drill press 178 includes a base housing 182, and a motor housing 186. Referring to FIG. 12, the drill press 178 further includes a magnetic base 190 for magnetically detachably coupling the drill press 178 and a ferromagnetic workpiece.

Referring to FIG. 12, the drill press 178 includes a workpiece illumination system 194. The workpiece illumination system 194 is coupled to a top portion 198 of the magnetic base 190. The workpiece illumination system 194 includes a first illuminator module 202 and a second illuminator module 206. Each of the first illuminator module 202 and the second illuminator module 206 includes a light assembly 210, such as an incandescent bulb, or light emitting diode (LED). Each of the first illuminator module 202 and the second illuminator module 206 is aligned to illuminate a work area of the work piece. In the illustrated embodiment, the first illuminator 202 and the second illuminator 206 are aligned to illuminate a work area along the bit axis 50.

Thus, the invention provides, among other things, a magnetic-base drill press. Various features and advantages of the invention are set forth in the following claims.

What is claimed is:

1. A magnetic drill press comprising:
a housing;
a magnetic base coupled to the housing for engagement with a workpiece;
a motor carriage slidably coupled to the housing;
an electric motor supported by the motor carriage and configured to rotate a bit about a bit axis;
a spindle assembly supported by the housing and coupled to the motor carriage for selectively positioning the motor carriage relative to the housing; wherein the spindle assembly includes
a collar having an inside surface;
an outer spindle to which the handle hub is drivingly engaged;
an inner spindle drivingly coupled to the motor carriage;
a spindle hub body acting as an interface between the outer spindle and the inner spindle; and
a dog member engaging the inside surface of the collar to substantially inhibit rotation of the spindle hub body in the absence of applied torque to the outer spindle, the dog member permitting rotation of the spindle hub body in response to rotation of the handle hub and the outer spindle to thereby move the motor carriage relative to the housing;
a handle hub coupled to the spindle assembly; and
a ratchet assembly including a ratchet head coupled to the handle hub and a ratchet handle coupled to the ratchet head for actuating the spindle assembly by reciprocating motion of the ratchet handle.

2. The magnetic drill press of claim 1, further comprising a handle member fixedly coupled to the handle hub for actuating the spindle assembly by continuous motion of the handle member.

3. The magnetic drill press of claim 1, wherein the dog member is co-rotatable with the spindle hub body and the outer spindle in response to a torque input through the handle hub and the outer spindle.

4. The magnetic drill press of claim 3, wherein the dog member includes a groove configured to receive a corresponding dog lug formed on the outer spindle.

5. The magnetic drill press of claim 4, wherein the groove includes a side wall configured to engage the dog lug formed on the outer spindle.

6. The magnetic drill press of claim 3, wherein the spindle hub body includes a dog actuator portion defining a plurality of radial lobes and radial recesses against which the dog member is engageable.

7. The magnetic drill press of claim 6, wherein the inside surface of the collar defines a plurality of teeth, and wherein the dog member is displaced in a radially outward direction to engage the teeth in response to rotation of the dog actuator portion relative to the dog member caused by a torque input through the inner spindle and the spindle hub body.

8. The magnetic drill press of claim 7, wherein subsequent to the dog member engaging the teeth on the collar, further rotation of the dog actuator portion, the spindle hub body, and the inner spindle is inhibited, thereby preventing further movement of the motor carriage relative to the housing.

9. The magnetic drill press of claim 1, further comprising an illumination system having a first light and a second light, each of which is spaced laterally from the bit axis.

10. The magnetic drill of claim 9, wherein the illumination system is electrically coupled and selectively controlled by a switch coupled to the housing.

11. A magnetic drill press comprising:
a housing;
a magnetic base coupled to the housing for engagement with a workpiece;
a motor carriage slidably coupled to the housing;
an electric motor supported by the motor carriage and configured to rotate a bit about a bit axis;

a spindle assembly supported by the housing and coupled to the motor carriage for selectively positioning the motor carriage relative to the housing, the spindle assembly including
- a collar fixed to the housing and having an inside surface;
- a first spindle that receives a torque input from a user of the drill press in a first rotational direction, causing the first spindle to rotate;
- a second spindle drivingly coupled to the motor carriage;
- a spindle hub body acting as an interface between the first spindle and the second spindle; and
- a dog member positioned between the inside surface of the collar and the spindle hub body, wherein the dog member is disengaged from the inside surface of the collar in response to torque input on the first spindle in the first rotational direction to permit movement of the motor carriage relative to the base housing, and wherein the dog member is engaged with the inside surface of the collar in response to a torque input on the second spindle in an opposite, second rotational direction to inhibit movement of the motor carriage relative to the housing.

12. The magnetic drill press of claim 11, wherein the inside surface of the collar includes a plurality of teeth with which the dog member is engageable.

13. The magnetic drill press of claim 11, further comprising:
- a handle hub coupled to the spindle assembly; and
- a ratchet assembly including a ratchet head coupled to the handle hub and a ratchet handle coupled to the ratchet head for actuating the spindle assembly by reciprocating motion of the ratchet handle.

14. The magnetic drill press of claim 11, wherein the dog member is co-rotatable with the spindle hub body in response to a torque input on the first spindle in the first rotational direction.

15. The magnetic drill press of claim 14, wherein the dog member includes a groove configured to receive a corresponding dog lug formed on the first spindle.

16. The magnetic drill press of claim 15, wherein the groove includes a side wall configured engaged the dog lug formed on the first spindle.

17. The magnetic drill press of claim 14, wherein the spindle hub body includes a dog actuator portion defining a plurality of radial lobes and radial recesses against which the dog member is engageable.

18. The magnetic drill press of claim 17, wherein the inside surface of the collar defines a plurality of teeth, and wherein the dog member is displaced in a radially outward direction to engage the teeth in response to rotation of the dog actuator portion relative to the dog member caused by a torque input on the second spindle in the second rotational direction.

19. The magnetic drill press of claim 18, wherein subsequent to the dog member engaging the teeth on the collar, further rotation of the dog actuator portion, the spindle hub body, and the second spindle is inhibited, thereby preventing further movement of the motor carriage relative to the housing.

* * * * *